United States Patent
Kodama

(10) Patent No.: US 6,249,275 B1
(45) Date of Patent: *Jun. 19, 2001

(54) PORTABLE INFORMATION GATHERING APPARATUS AND INFORMATION GATHERING METHOD PERFORMED THEREBY

(75) Inventor: Yoshiyuki Kodama, Nagano-ken (JP)

(73) Assignee: Seiko Epson Corporation, Suwa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/792,025

(22) Filed: Jan. 31, 1997

(30) Foreign Application Priority Data

Feb. 1, 1996 (JP) ..................................... 8-016902

(51) Int. Cl.[7] ....................................... G09G 5/00
(52) U.S. Cl. ........................... 345/173; 345/179; 345/131
(58) Field of Search ................................... 345/173, 179, 345/131, 141, 169; 178/18, 19, 20

(56) References Cited

U.S. PATENT DOCUMENTS

| | | | |
|---|---|---|---|
| 4,694,406 | * 9/1987 | Shibui et al. | 345/123 |
| 4,954,969 | * 9/1990 | Tsumura | 345/173 |
| 5,008,854 | * 4/1991 | Maeda et al. | 345/173 |
| 5,063,600 | * 11/1991 | Norwood | 345/173 |
| 5,237,651 | * 8/1993 | Randall | 345/179 |
| 5,394,166 | * 2/1995 | Shimada | 345/131 |
| 5,644,339 | * 7/1997 | Mori et al. | 345/173 |

\* cited by examiner

Primary Examiner—Jeffery Hofsass
Assistant Examiner—John Tweel, Jr.
(74) Attorney, Agent, or Firm—Hogan & Hartson, LLP.

(57) ABSTRACT

A portable table information gathering apparatus and an information gathering method performed thereby display information which has been gathered by a tablet, image input, voice input, etc. and they also store the gathered information. When input pen information is entered through the tablet, image information is entered through the image input, or voice information is entered through the voice input, all the information is written successively in the form of collective data for each page, which corresponds to one screen, to areas in storing units, the areas being assigned according to the respective pages. This arrangement obviates the need for setting the mode according to the type of information to be captured.

13 Claims, 8 Drawing Sheets

PORTABLE INFORMATION GATHERING APPARATUS AND INFORMATION GATHERING METHOD PERFORMED THEREBY

BACKGROUND OF THE INVENTION

1. Field of the Invention

The present invention relates to portable information gathering equipment such as a pen computer, and more particularly to a portable information gathering apparatus which enables efficient input of information such as spoken statements, images, and characters, and an information gathering method performed by such apparatus.

2. Description of the Related Art

In recent years, pen computers and other similar devices have come into widespread use as portable information gathering equipment. There are being developed pen computers which are not only provided with functions for recording information written on a tablet screen with an input pen, but also pen computers provided with a function for capturing images and spoken statements also. There are increasing tendencies to enhance the multifunctional features of such pen computers for greater convenience.

FIG. 9 is a schematic block-diagram showing conventional portable information gathering equipment constructed to perform the function of recording information written on a tablet screen with an input pen and also the function of capturing images and voice inputs. This portable information gathering equipment is constituted primarily by a CPU 1, a ROM 2 in which processing programs and the like are stored, a data memory 3, a tablet 6 which combines a digitizer 4 and an LCD 5 into one piece, an image input device 7, a voice input device 8, a voice output device 9, an information gathering menu selector 10, and a system bus 11 for connecting these components to the CPU 1.

Judging from the illustrated configuration, this type of conventional portable information gathering equipment is designed to capture image and voice information in addition to the pen input information which is known as "ink information" captured through the tablet 6.

In the conventional portable information gathering equipment, however, whenever entering information, a menu selection has to be performed through the information gathering menu selector 11 to properly set the mode in accordance with the type of information to be captured before entering the information. For instance, to enter an image and then characters, the mode must be set first for image input to capture an image, then the mode must changed to character input to take in characters.

For the portable information gathering equipment to be user-friendly, all the different types of captured information, namely, the image information, the voice information, and the ink information, should be handled as a collection on a page basis (hereinafter referred to as "page data"). For example, to record the information about a certain product in terms of one-page information, it would be convenient to enter the image of the product and add the description of the image in terms of voice information or ink information entered using a pen, thus handling all the image, voice, and ink information as a piece of page data, that is, handling them in units of pages.

More specifically, it is desirable that multimedia information, including image information, voice information, and ink information, captured by a user arbitrarily be stored automatically in a storing means as page data, i.e. a single piece of collective data on a page basis without the need for operation by the user so that the user is not even aware of the processing.

This type of conventional portable information gathering equipment, however, has not been designed to automatically handle all of the image information, voice information, and ink information as page data for each page without the need for the performance of operations by the user of the equipment.

Thus, the conventional portable information gathering equipment requires that the mode be set for each type of information to be captured before starting the capture of the information matched to the mode. Further, the conventional equipment is not capable of handling captured image information, voice information, and ink information as a collection of page data for each page without the need operations by the user, thus leaving room for improvement in the aspect of ease of use.

SUMMARY OF THE INVENTION

Accordingly, it is an object of the present invention to provide a portable information gathering apparatus and an information management method performed therein which obviate the need for setting the mode according to the type of information to be captured, whether it is image information, voice information, or ink information, which enable a user thereof to enter any type of information as he or she desires, and which handle a plurality of types of information such as images, voices, and ink as a collection of page data for each page, thereby permitting markedly easy displaying and reading of captured information.

To this end, according to one aspect of the present invention, there is provided a portable multimedia information gathering apparatus which gathers and displays entered information and also stores the gathered information, and which is equipped with: respective information input means for capturing a plurality of types of information; data storing means wherein the information entered at random through respective information input means for capturing the plurality of types of information for each page, which corresponds to one screen, is written at specified addresses; page changing means for changing a page, which corresponds to one screen, when capturing information or when reading the information stored in the data storing means; storing means where contents necessary for implementing the processing of the system are stored; and a CPU for controlling all of these means.

The respective information input means for capturing the plurality of types of information are at least two information input means among an input/display tablet which captures information when the screen thereof is touched and displays the captured information, an image input means for entering images, and voice input means for entering spoken information. The information which is captured through these information input means are at least two types of information among tablet input information, image input information, and voice input information.

Thus, a plurality of pieces of multimedia information such as image information, ink information, and voice information can be stored automatically in a data storing means as a single collection of page data for each page without the need for any operations by the user of the apparatus.

The aforesaid storing means has a page address area for specifying the address of each page into which information has been captured, a page content indicating address area which exists at an address indicated in the page address area and to which an address indicating an area where the information regarding a corresponding page has been stored is written, and an input information storing area which exists at an address indicated in the page content indicating address area and to which various types of information captured into corresponding pages are written respectively at predetermined addresses therein.

With this arrangement of the data storing means, when capturing various types of information such as image information, voice information, and ink information, it is no longer necessary to set the mode for each type of information to be captured, enabling the user to enter any type of information as desired. Moreover, the apparatus is capable of handling images, voices, and characters as one collective page data for each page. These features are extremely convenient for displaying or reading the information which has been captured.

The addresses written to the page content indicating address area are: the addresses indicating the areas where the information regarding a page associated with a page which is currently being specified has been stored; and the addresses indicating the areas where such input information, as tablet input information, image information, and voice information, which has been captured in the page currently being specified have been stored.

Thus, the information indicating the addresses of the pages which are written to the page content indicating address area has a two-way list structure, so that a leading address may be shared by the related pages, namely, the preceding and following pages in this embodiment. With this arrangement, if, for example, the second page is deleted, the leading address of the third page as the following page may be used for the first page and the leading address of the first page as the preceding page may be used for the third page, thus permitting easy page insertion or deletion and accordingly permitting easy deletion or insertion of data.

When the aforesaid voice information is entered, an icon, which indicates that the spoken information is present as input information and which serves as an indicating point for reading the spoken information, is displayed on the tablet.

This visualizes and displays the presence of the voice in the captured information. Reading the voice information requires just pointing at the icon, leading to greater ease of operation.

According to another aspect of the present invention, there is provided a multimedia information gathering method performed in a portable information gathering apparatus, whereby the information which has been gathered through information input means for capturing a plurality of types of information is displayed and stored in a data storing means, and wherein the information which has been entered arbitrarily through the information input means for capturing the plurality of types of information is handled as a collection of data for each page which corresponds to one screen and the data for each page is written at specified addresses in the data storing means.

The respective information input means for capturing the plurality of types of information are at least two input means among the input/display tablet which captures information when the screen thereof is touched and displays the captured information, the image input means for entering images, and the voice input means for entering spoken information. The information which is captured through these information input means are at least two types of information among tablet input information, image input information, and voice input information.

Thus, a plurality of pieces of multimedia information such as image information, ink information, and voice information can be stored automatically in the data storing means as a single collection of page data for each page without the need for any operation by the user of the apparatus.

The area of the aforesaid data storing means assigned to each page has the page address area for specifying the address of each page into which information has been captured, a page content indicating address area which exists at an address indicated in the page address area and to which an address indicating an area where the information regarding a corresponding page has been stored is written, and an input information storing area which exists at an address indicated in the page content indicating address area and to which various types of information captured into corresponding pages are written respectively at predetermined addresses therein.

With this arrangement of the data storing means, when capturing various types of information such as image information, voice information, and ink information, it is no longer necessary to set the mode for each type of information to be captured, enabling the user to enter any type of information arbitrarily. Moreover, the apparatus is capable of handling images, spoken statements, and characters as one collective set of page data for each page. These features are extremely convenient for displaying or reading the information which has been captured.

The addresses written to the page content indicating address area are: the addresses indicating the areas where the information regarding a page associated with a page which is currently being specified has been stored; and the addresses indicating the areas where such input information as tablet input information, image information, and voice information which has been captured in the page currently being specified have been stored.

Thus, the information indicating the addresses of the pages which are written to the page content indicating address area has a two-way list structure, so that a leading address may be shared by the related pages, namely, the preceding and following pages in this embodiment. With this arrangement, if, for example, the second page is deleted, the leading address of the third page as the following page may be used for the first page and the leading address of the first page as the preceding page may be used for the third page, thus permitting easy page insertion or deletion and accordingly permitting easy deletion or insertion of data.

When the aforesaid voice information, or spoken statement, is entered, an icon, which indicates that the voice is present as input information and which serves as an indicating point for reading the voice, is displayed on the tablet screen.

This visualizes and displays the presence of the voice information in the captured information. Reading the voice information requires just pointing at the icon, thus leading to greater ease of operation.

DESCRIPTION OF THE PREFERRED EMBODIMENT

An embodiment of the present invention will now be described. In this embodiment, a pen computer is adopted as an example of the portable information gathering equipment in accordance with the present invention.

Figure 1:
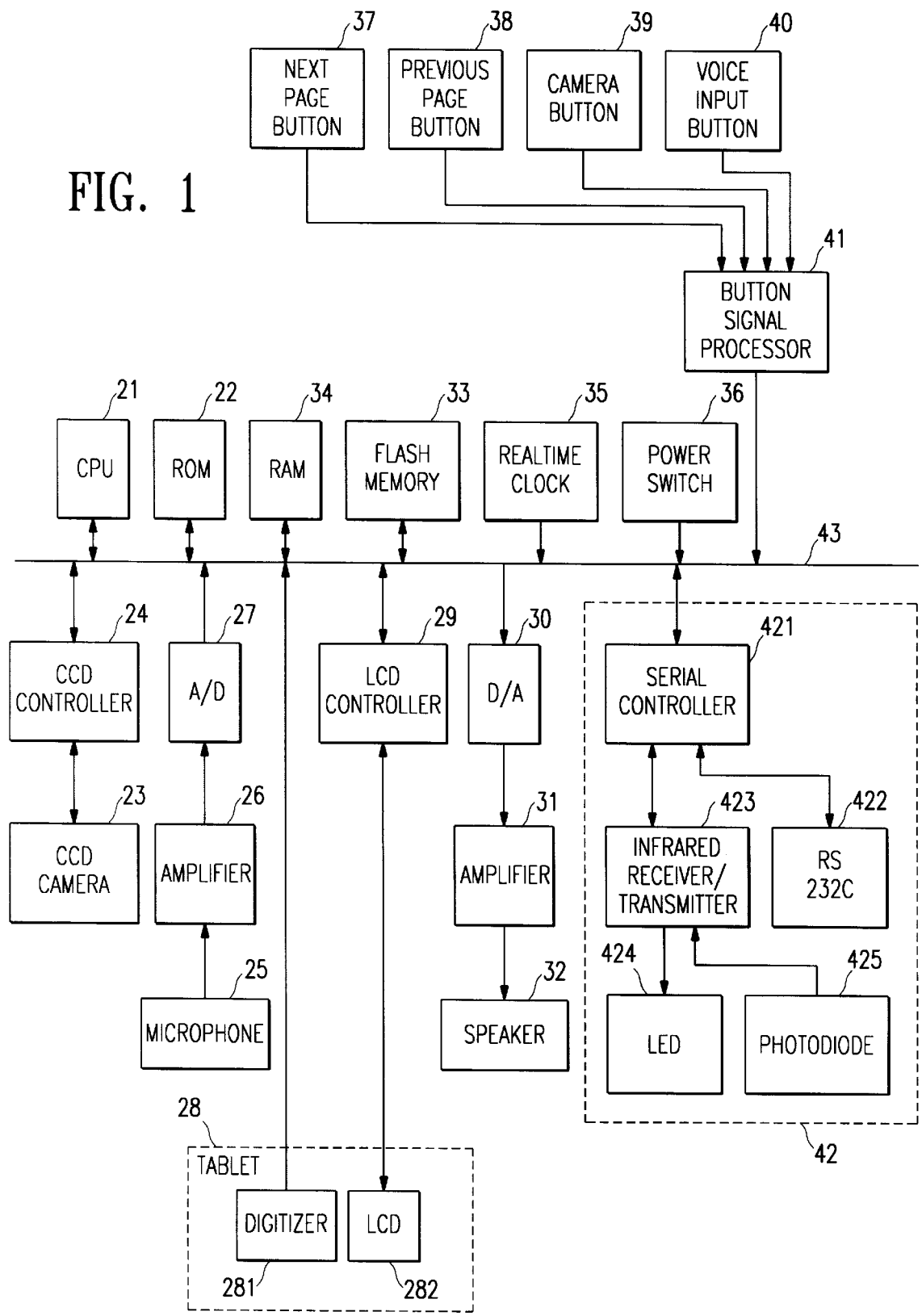
FIG. 1 is a block diagram illustrating the configuration of an embodiment of the present invention.

FIG. 1 is a block diagram illustrating the configuration of an entire pen computer to which the present invention has been applied. The pen computer is constituted primarily by: a CPU 21; a ROM 22 for storing basic processing programs for the pen computer and a program and data necessary for gathering information according to the present invention (the processing procedure based on the program will be described in detail later); a CCD camera 23 for capturing image information; a CCD controller 24 for driving the CCD camera 23 and for converting the signals received from the CCD camera to digital signals; a microphone 25 for capturing voice information; an amplifier 26 for amplifying voice signals received from the microphone 25; an analog-to-digital converter 27 for converting the voice signals to digital signals; an input/display tablet 28 which combines a digitizer 281 and a liquid crystal display (LCD) 282 into one unit and which captures information including characters and line drawings and which also displays the captured information; an LCD circuit controller 29; a digital-to-analog converter 30 for converting the voice signals to analog signals when outputting voice signals; an amplifier 31; a speaker 32; a flash memory 33 serving as a data storing means for storing data captured by a user (the data to be stored in the flash memory and the storing areas thereof will be described in detail later); a RAM 34 used as a work memory when implementing various types of processing in the pen computer; a real time clock 35 which indicates the current time and provides time information and date information; a power switch 36; page feed buttons which are comprised of a next page button 37 and a previous page button 38; a camera button 39; a button signal processor 41 which detects the ON/OFF state of a button such as a voice input button 40 and issues signals corresponding to the ON/OFF state; an external equipment connecting device 42 for the transfer of information between itself and external information processing equipment such as a personal computer; and a system bus 43 for interconnecting the individual sections and component units.

The external equipment connecting device 42 is constructed primarily by: a serial controller 421; an RS232C port 422 used as an interface for connection to external information processing equipment such as a personal computer; an infrared receiver/transmitter 423 for performing optical communication with information processing equipment such as a personal computer; a light emitting diode (LED) 424; and a photodiode 425.

Figure 2:
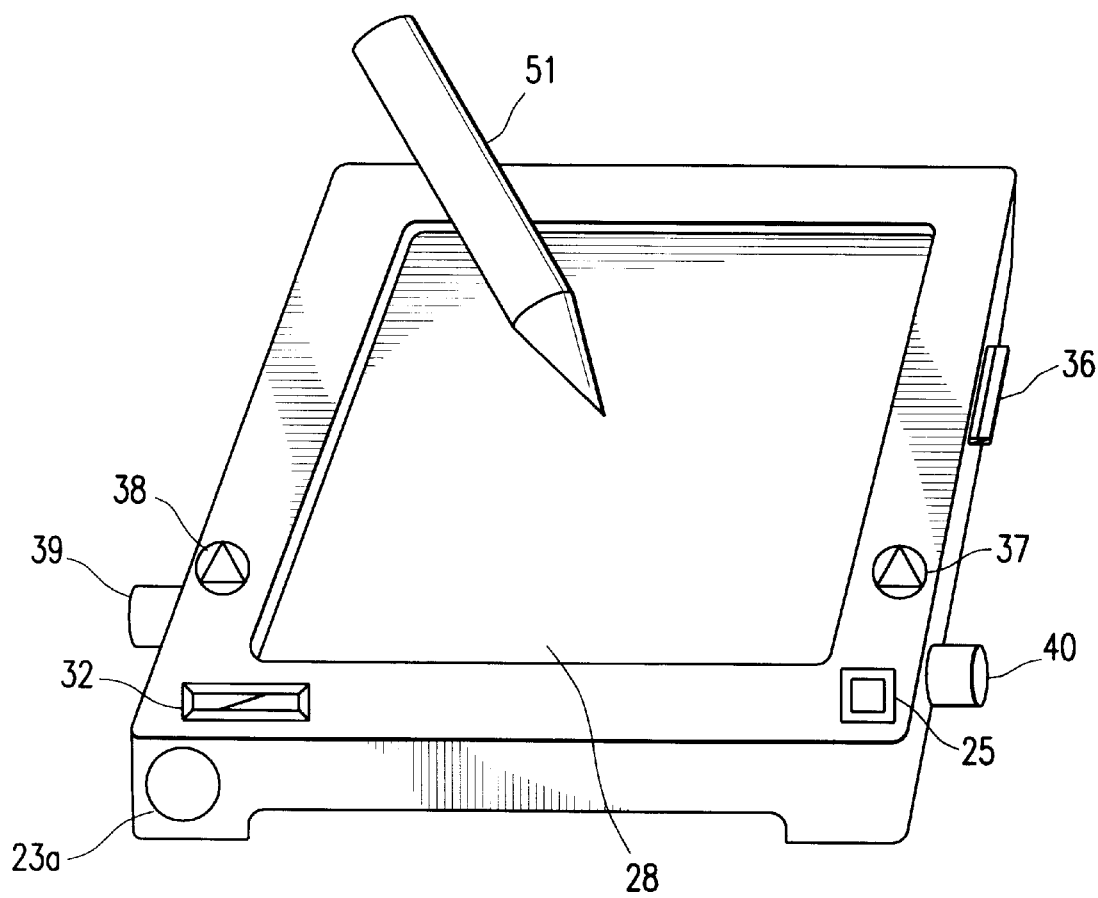
FIG. 2 is an external configuration view showing a pen computer representing the embodiment of the present invention.

FIG. 2 shows an external view of the pen computer in accordance with the present invention; components identical to those shown in FIG. 1 are assigned the same reference numerals as in FIG. 1. Among the constituent elements shown in FIG. 1, those that appear in the external view of FIG. 2 include the CCD camera 23 (more precisely a lens 23a of the CCD camera 23), the camera button 39, the tablet 28, the microphone 25, the speaker 32, the voice input button 40, the next page button 37, the previous page button 38, and the power switch 36. An input pen 51 is used to draw characters or lines on the screen of the tablet 28 and to point at icons.

In such a pen computer when characters or line pictures are written on the screen of the tablet 28 with the input pen 51, the CPU 21 inside reads coordinates from the digitizer 281 and displays the writing trace in the corresponding position of the LCD 282 and stores the coordinate data at a predetermined address of the flash memory 33.

To input an image through the CCD camera 23, the lens 23a of the CCD camera 23 is pointed at the image to be captured and the camera button 39 is first depressed halfway. This causes the image entered through the lens 23a to be projected as an animation on the screen of the tablet 28; and when the camera button 39 is further depressed, the image is locked and the locked image is captured. The image signal is converted to a digital signal by the CCD camera controller 24 before it is stored at a predetermined address in the flash memory 33.

To input spoken information, the voice input button 40 is depressed to admit the voice to be captured through the microphone 25; the voice is then amplified through the amplifier 26 and converted to a digital signal by the analog-to-digital converter 27 before it is stored at a predetermined address in the flash memory 33.

The operation for capturing information is performed in units of screens, i.e. on a page basis. The following will describe the processing procedure.

If the pen computer has never been used, when the power switch 36 is turned ON, nothing will be displayed on the screen of the tablet 28; this screen will be regarded as the first page. However, the following will describe an example wherein some information has already been captured into the first page and additional information will be captured on the second page and after.

In this example, the user of the pen computer will meet a person, whom he has never met before, to have a business discussion during which he will capture information regarding the person and the details of the discussion and also information about a product, which is the topic of the business discussion.

Figure 3A:
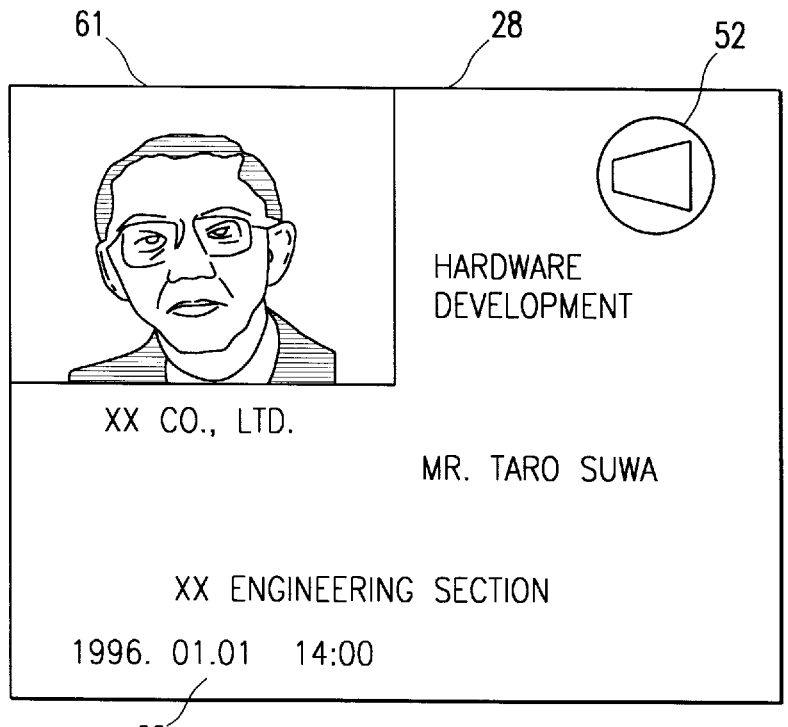
FIGS. 3A and 3B are pictorial views illustrative of examples of the display of information captured in the pen computer representing the embodiment of the present invention.

When the user first turns ON the power switch 36, the first page into which information has already been captured will be displayed. Pressing the next page button 37 causes the screen of the second page, into which no information has been captured yet, to be displayed. With the blank second page on the screen, in order to capture the image of the face of the person with whom the user is meeting, the user points the lens 23a of the CCD camera 23 at the person and depresses the camera button 39 halfway as previously described, then further, e.g. fully, depresses the camera button 39. This causes the then-existing face image, which is a stationary image, to be captured and the face image to be displayed on the screen of the tablet 28 at the same time, as shown in FIG. 3A; the image data is stored at a predetermined address of the flash memory 33. The position and size of the area where the image is displayed may be preset in the display area on the screen of the tablet 28 or they may be set according to the situations of each case.

FIG. 3A shows an example where an area of about a one-fourth of the display screen at top left thereof is set as the image area.

The user of the pen computer then writes, with the input pen 51, memo-type information, including the name of the person, the company name and the department or section to which he belongs, as the information on the person. The ink information such as the characters or line drawings entered with the input pen 51 is displayed on the screen of the tablet 28 as the user draws them and it is also stored at a predetermined address in the flash memory 33.

Furthermore, to record an important part of the discussion in terms of a spoken statement, the voice input button 40 is depressed to capture the spoken statement. The captured spoken statement is subjected to digital conversion and stored as a voice signal at a predetermined address in the flash memory 33. Upon completion of capturing the spoken statement, or voice information, an icon 52 indicating the completion of recording appears at a predetermined point on the screen of the tablet 28. This icon 52 is used also for function reading. To be more specific, when the data on the page is read later, the voice information is read and reproduced from the predetermined address in the flash memory in response to pointing at the icon 52 with the input pen 51.

FIG. 3A shows an example where the information which has been captured according to the procedure described above is displayed on the screen of the tablet 28, that is the information on the second page. As is seen from FIG. 3A, the icon 52 provides visual information of the page information of one page unit; it shows the presence of face image information 61, ink information 62 such as characters and line drawings, and the voice information in the captured information. As previously described, the voice information is read from the predetermined address and output through the speaker 32.

In addition to the information referred to above, information indicating the date at that point is also displayed automatically as an output from the real-time clock 35. The date and time information is also written at a predetermined address in the flash memory 33 as part of the page additional information.

To go on to the next page, namely the third page, so as to take in new information after finishing the collection of the information for the second page, the user presses the next page button 37 to use the third page to capture more information.

The write area for the data stored in the flash memory 33 will be described later.

Figure 3B:
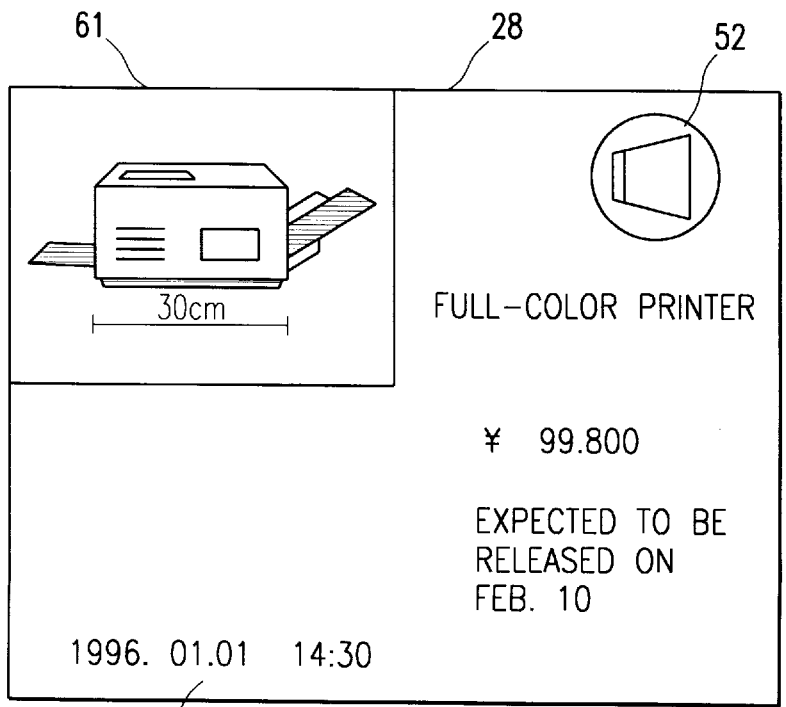

FIG. 3B shows an example of the information written to the third page in which an image 63 of the product as the image information and character information 64 including the product name and characteristics thereof such as the price and the outline of performance have been entered; and voice information such as a spoken remark "this product is planned to be released on xx day of xx month" has also been entered to add to the above image and character information. In this case also, the icon 52 is displayed when the voice information is captured.

Thus, information can be captured on a page basis; all types of information, namely, image information, ink information, and voice information, can be captured into each different page as the user desires without the need of selecting menus, that is without the need of changing the mode. In other words, as soon as finishing the input of the image, the user can immediately start entering characters or line drawings with the input pen 51 and then enter the voice information arbitrarily. There is no particular order of capturing these different types of information of image, ink, and voice; they may be captured in any order. Also, it is not necessary to enter all types of information; instead, only image information and ink information or only voice information and ink information may be captured, or only ink information or image information may be captured as necessary. Incidentally, in the conventional equipment, to capture an image, the mode must be set for an image input mode to enter images, or the mode must be set for an input pen mode to enter information using the input pen. Thus, the user was required to set the mode for each type of information to be entered before starting the inputting of information.

Figure 4:
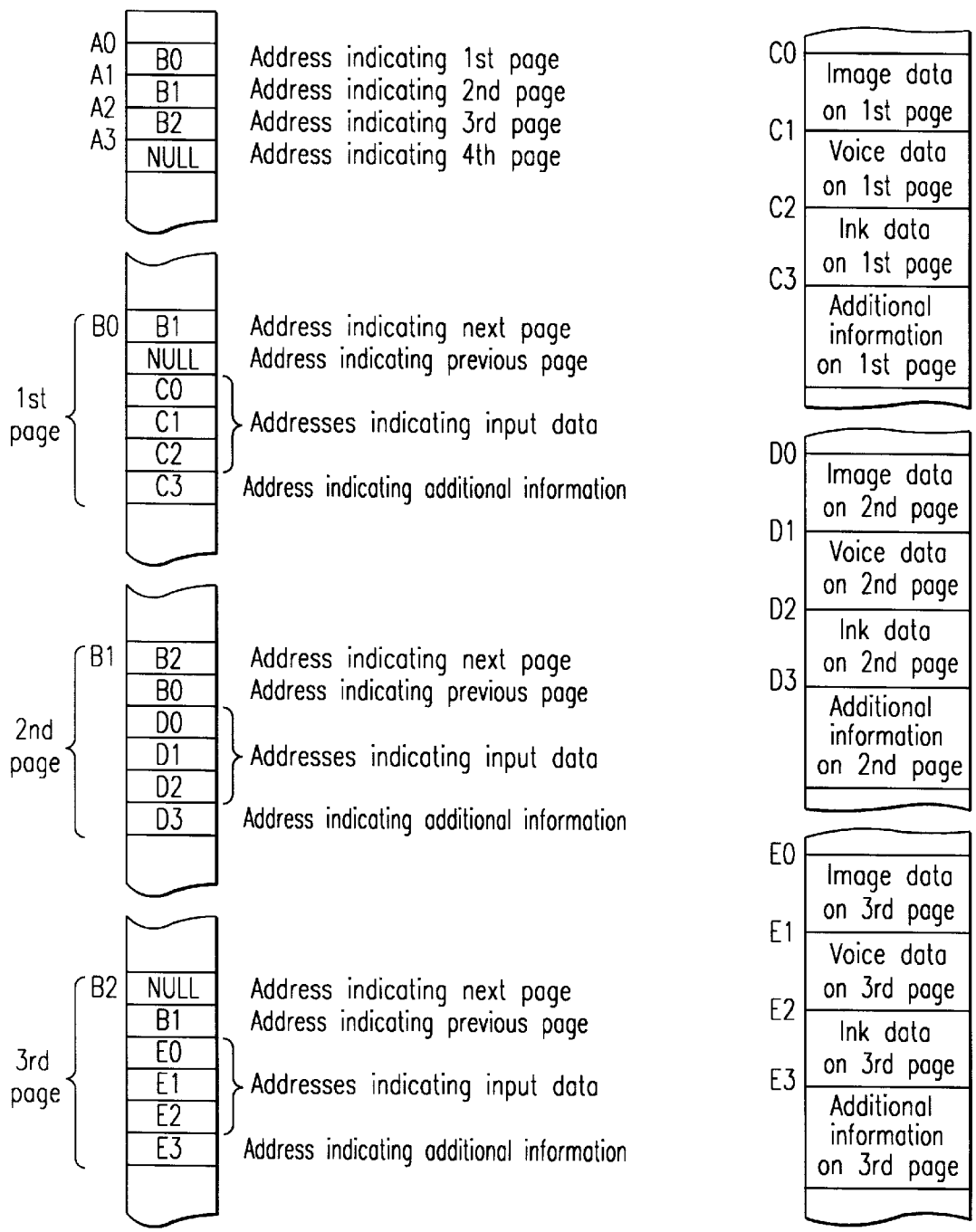
FIG. 4 is a diagram illustrative of the contents of a flash memory in the embodiment of the present invention.

FIG. 4 shows an example of the contents of the flash memory 33 when the processing for capturing the information described above is implemented; it shows the stored contents of a page, namely the third page, to which data is currently being entered, the previous page, namely the second page, and the further previous page, namely the first page. A description will now be given with reference to FIG. 4.

In FIG. 4, written at addresses A0, A1, A2, and so on are the addresses B0, B1. etc., where the information of respective pages has been stored for each page which has the information.

For easier understanding, it is assumed that the page into which data has first been captured is the first page, the page into which data has been captured next is the second page, and the page into which data is currently being captured is the third page, no data having been captured in any page following the third page.

In FIG. 4, the aforesaid addresses A0, A1, A2, and so on form a page address area showing theaddress for each page into which information has been captured. Written at the address A0 is an address B0 as the address at which the information of the first page has been stored; written at the address A1 is the address B1 as the address at which the information of the second page has been stored; and written at the address A2 is the address B2 as the address at which the information of the third page has been stored. Written at the address A3 is "NULL", which means that there is no fourth page.

Addresses B0, B1, B2, and so on form an address area which indicates the contents of pages and in which the addresses indicating the area where the information regarding the respective pages has been stored. Written at the address B0, where the information on the first page has been stored, is B1 as the address at which the information of the next page, i.e. the second page in this embodiment, has been stored. "NULL", which means that the page is the first page, is written as the address at which the information on the preceding page has been stored. Further, C0, C1, and C2 are written as the addresses at which the information captured into the first page has been stored, and C3 is also written as the address at which the page additional information of the first page has been stored.

Written at the address B1 where the information regarding the second page has been stored are: B2 as the address where the information regarding the next page, i.e. the third page in this embodiment, has been stored; B0 as the address where the information on the preceding page, i.e. the first page in this embodiment, has been stored; D0, D1, and D2 as the addresses where the information captured into the second page has been stored; and D3 as the address at which the page additional information of the second page has been stored.

Written at the address B2 where the information of the third page, i.e. the page into which data is currently being entered, has been stored is "NULL" as the address at which the information of the next page has been stored (it is indicated that the third page is the last page); the address B1 as the address at which the information of the previous page, i.e. the second page in this embodiment, has been stored; E0, E1, and E2 as the addresses at which the information captured into the third page has been stored; and an address E3 at which the page additional information of the third page has been stored.

The image data of the first page has been stored at the address C0; the ink data of the first page has been stored at the address C1; the voice data of the first page has been stored at the address C2. Further, the image data of the second page has been stored at the address D0; the ink data of the second page has been stored at the address D1; and the voice data of the second page has been stored at the address D2. Likewise, the image data of the third page has been stored at the address E0; the ink data for the third page has been stored at the address E1; and the voice data of the third page has been stored at the address E2. In addition to the input information described above, additional information for each page such as the date and time as mentioned above in this embodiment has been stored at the address C3 for the first page, at the address D3 for the second page, and at the address E3 for the third page.

The example illustrated in FIG. 4 shows the various types of information including the image data, voice data, and ink data which are written in the flash memory in order on the basis of pages; however, the locations where the information is written are specified by the addresses such as C0, C1, and so on, D0, D1, and so on, and E0, E1, and so on which indicate the input data writing positions for the respective pages, and the information is not necessarily written at consecutive addresses in units of pages. For instance, the address C0 may be assigned to the image data of the first page, the address D2 may be assigned to the ink data of the first page, and the address E1 may be assigned to the voice data of the first page, and the address C1 may be assigned to the image data of the second page, the address E0 may be assigned to the ink data of the second page, and the address C2 may be assigned to the voice data of the second page.

The information indicating the addresses of the respective pages which are written at the addresses B0, B1, and B2 has a two-way list structure, so that leading addresses may be shared by the related pages, namely the preceding and following pages, in this embodiment.

For example, the address B2 which indicates the next page and which is written at the address B1 (second page) indicates the leading address of the area where the information on the third page is stored. Likewise, the address B0 which indicates the preceding page and which is written at the address B1 (second page) indicates the heading address of the area where the information of the first page is stored.

Similarly, the address B1 which indicates the previous page and which is written at the address B2 (third page) indicates the leading address of the area where the information of the second page is stored.

With this list structure, if, for example, the second page is deleted, the leading address of the third page as the following page may be used for the first page and the leading address of the first page as the preceding page may be used for the third page, thus permitting easy insertion or deletion of pages and accordingly permitting easy insertion or deletion of data.

In this manner, the information for each page is written to the flash memory 33.

A specific example of image data and ink data of the second page is shown in FIG. 3A; a specific example of image data and ink data of the third page is shown, in FIG. 3B. The voice data serves, for example, as a supplementary description for the captured image data or the like; the icon 52 which indicates the presence of voice input is displayed.

FIG. 5 through FIG. 8 show the flowcharts illustrative of the information gathering processing procedure in the pen computer in accordance with the present invention described above. The processing procedure will be described with reference to FIG. 5 through FIG. 8.

Figure 5:
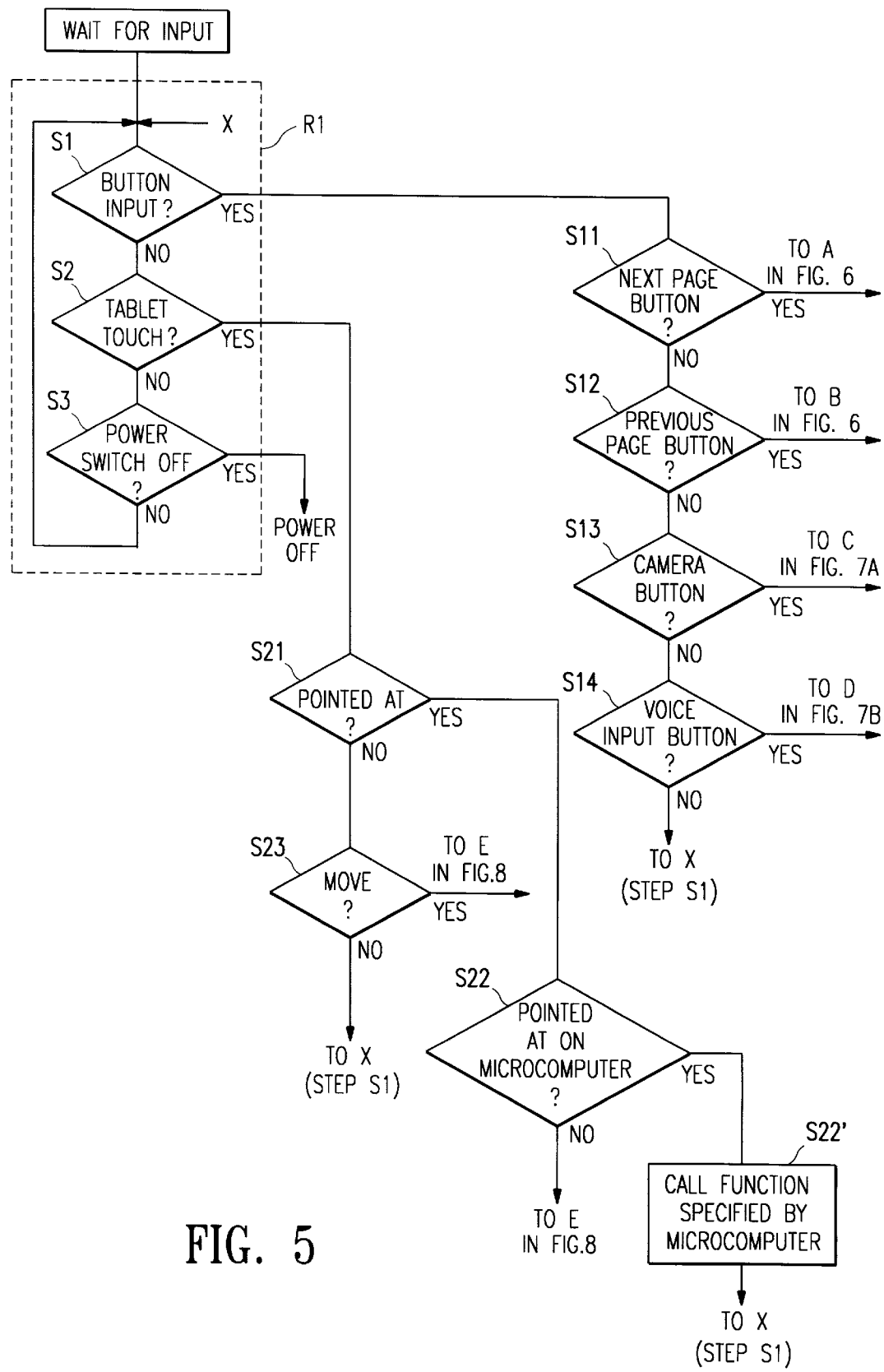
FIG. 5 is a flowchart illustrative of a first part of a processing procedure in the embodiment of the present invention.

In FIG. 5, a processing loop denoted by R1 is the processing loop which is applied when the power switch 36 is ON. The program determines in a step S1 whether the buttons such as the next page button 37, the previous page button 38, the camera button 39, the recording button 40, etc. have been turned ON; if the determination result is negative, then it further determines in a step S2 whether the tablet has been touched and if the determination result is negative, then it determines in a step S3 whether the power switch 36 has been turned OFF and if the determination result is negative, then it goes back to the step S1. This means that the program repeats the processing loop, that is it repeats the steps S1 and S2 as long as the power switch 36 stays ON.

If the program decides in the step S1 that any button has been depressed, then it determines in steps S11 through S14 which one of the next page button 37, the previous page button 38, the camera button 39, and the voice input button 40 has been depressed.

Figure 6A:
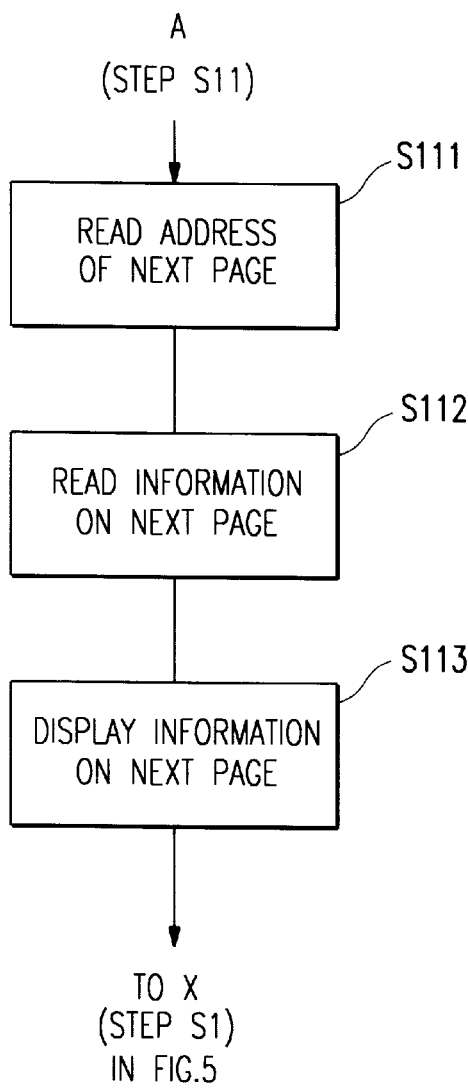
FIGS. 6A–6B are flowcharts illustrative of a second part of the processing procedure in the embodiment of the present invention.

If the depressed button is the next page button 37, then, as shown in FIG. 6A, the program reads from the flash memory 33 the address of the next page in relation to the currently displayed page (step S111), reads the information such as image, ink, and voice information which has been captured by the user from a predetermined address (step S112), and displays the read contents on the screen of the tablet 28 (step S113). To be more specific, taking FIG. 4 as an example, when the currently displayed page is the second page and the next page is the third page, the leading address, namely, the address B2, of the third page is read out of the information of the currently displayed second page, then there is read out the information from the addresses E0, E1, and E2 (and E3 if there is additional information) written at the address B2 and the read information is displayed on, for example, the screen of the tablet 28 as shown in FIG. 3B. If the currently displayed page is the third page and the next page is the fourth page and no information has been recorded on the fourth page, then the fourth page with no information will appear on the screen. Thus, whenever the next page button 37 is depressed, the information of the corresponding page is read and displayed on the screen of the tablet 28. The program then returns to the step S1 of FIG. 5 to wait for the next operation by the user.

Figure 6B:
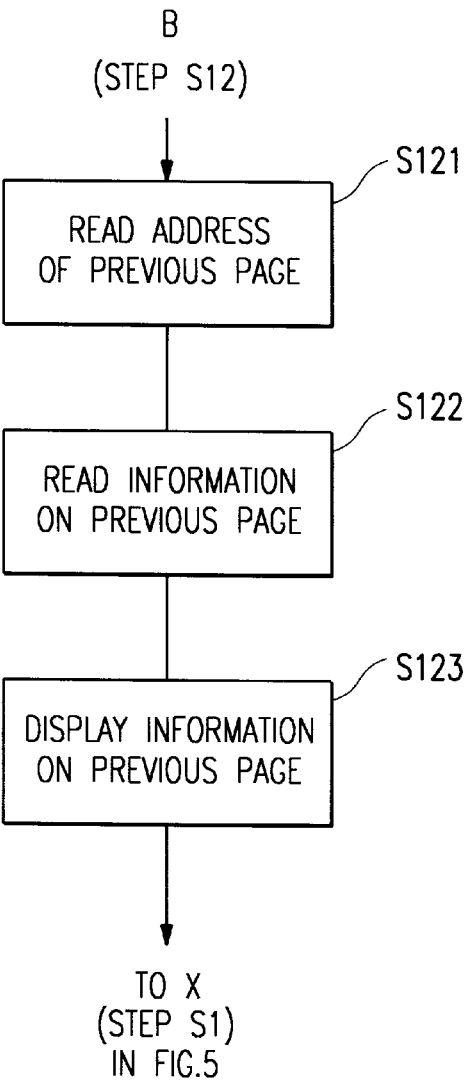

** If the depressed button is the previous page button 38, as shown by the processing procedure in FIG. 6B, the program reads the address of the previous page in a step image information, ink S121, reads the information such as information, and voice information, which have been captured by the user, from a predetermined address from the flash memory 33 (step S122), and displays the contents entered in the page on the screen of the tablet 28 (step S123) Specifically, taking the case shown in FIG. 4 as an example, if the currently displayed page is the third page and the previous page is the second page, then the program reads the leading address, namely, the address B1, of the second page from the information of the currently displayed third page, then it reads the information from the addresses D0, D1, and D2 (and D3 if there is additional information) written at the address B1 and displays the read information on, for example, the screen of the tablet 28 as shown in FIG. 3A. Thus, whenever the previous page button 38 is depressed, the information of the corresponding page is read and displayed on the screen of the tablet 28. The program then returns to the step S1 of FIG. 5 to wait for the next operation by the user.

Figure 7A:
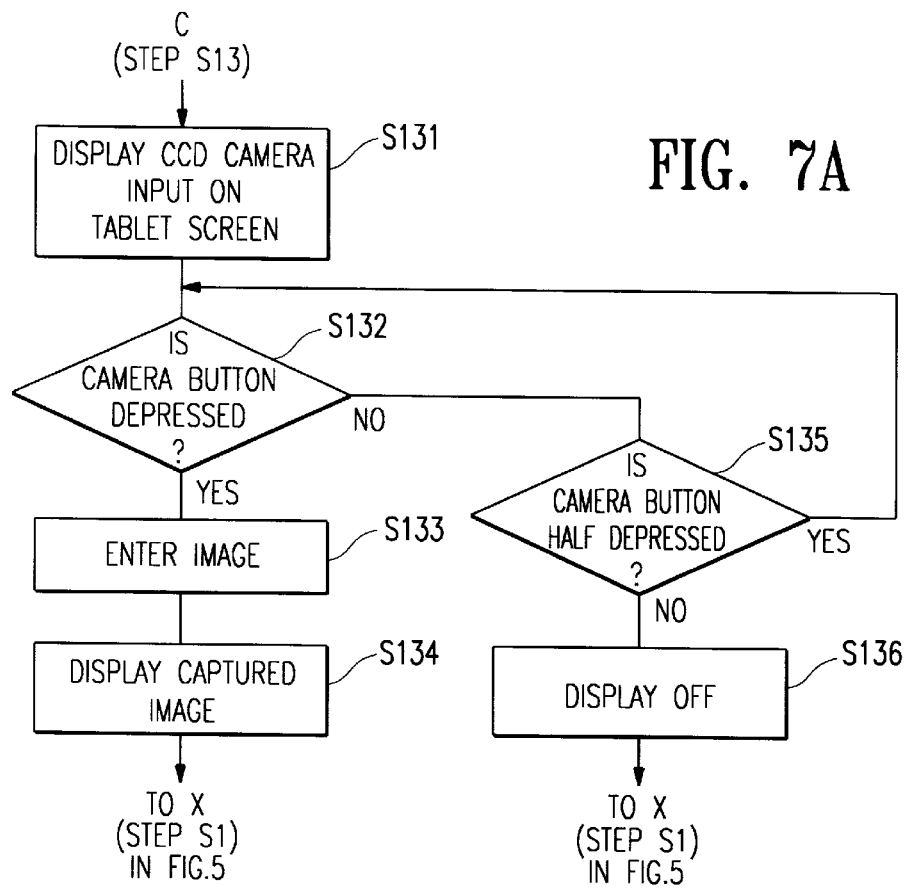
FIGS. 7A–7B are flowcharts illustrative of a third part of the processing procedure in the embodiment of the present invention.

If the depressed button is the camera button 39 and if the camera button 39 has been depressed halfway, as shown by the processing procedure in FIG. 7A, the image entered in the CCD camera 23 is shown in the form of animation on the screen of the tablet 28 (step S131). The program then determines in a step S132 whether the camera button 39 has been fully depressed and if the determination result is affirmative, then it takes in the then image in a step S133 and displays the captured static image on the screen of the tablet 28 in a step S134. The captured image data is stored at a predetermined address of the corresponding page in the flash memory 33. The program then goes back to the step S1 of FIG. 5 to wait for a further operation by the user. If the program determines in the step S132 that the camera button 39 has not been fully depressed, then it further determines in a step S135 whether it has been halfway depressed, or if the determination result is negative, then it does not display any image in step S136, assuming that the camera button 39 is OFF. After that, the program goes back to the step S1 of FIG. 5 to wait for the next operation. In the step S135, if the camera button 39 is halfway depressed, the program goes back to the step S132.

Figure 7B:
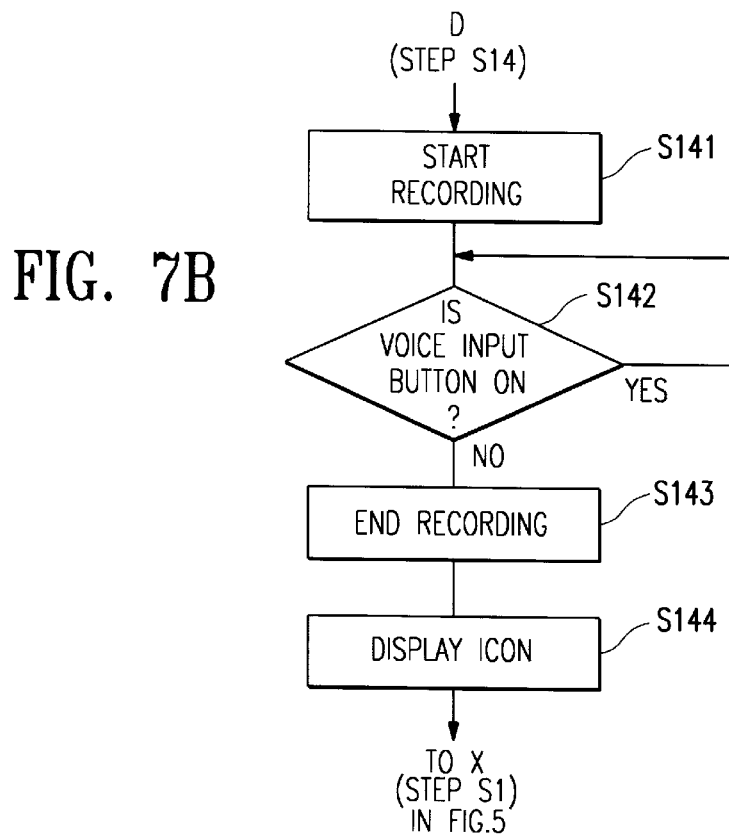
Figure 8:
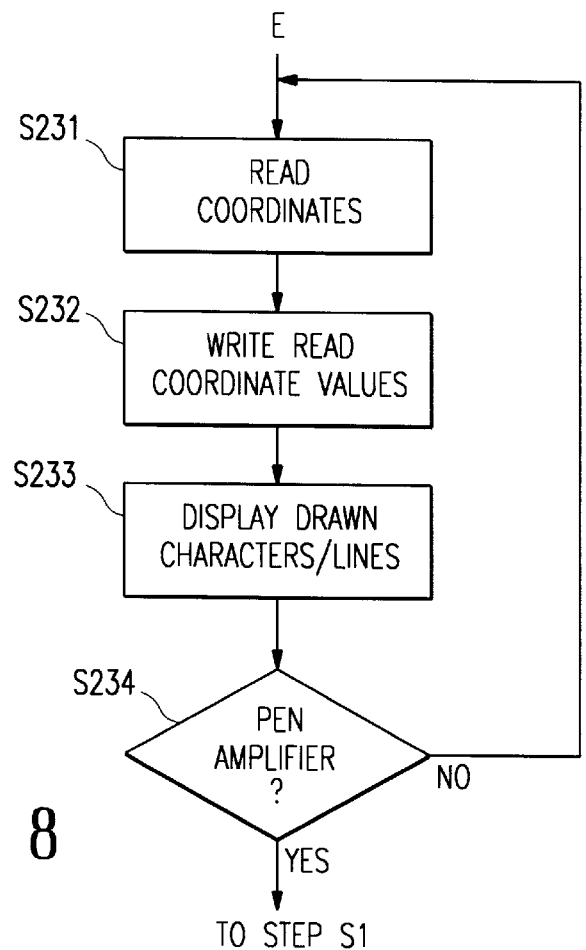
FIG. 8 is a flowchart illustrative of a fourth part of the processing procedure in the embodiment of the present invention.
Figure 9:
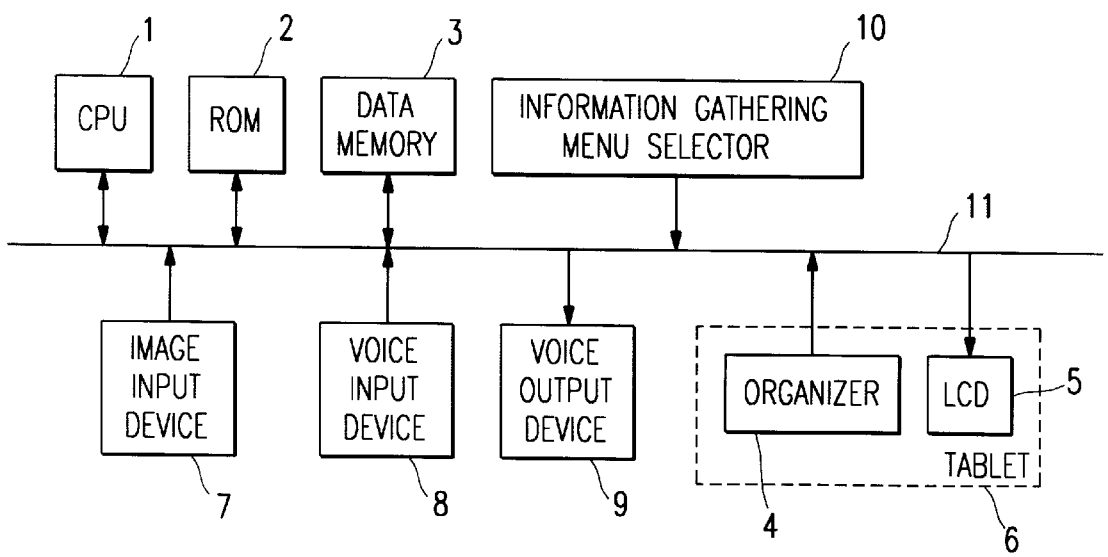
FIG. 9 is a block diagram showing a schematic configuration of a conventional multimedia information gathering apparatus.

If the depressed button is the voice input button 40, then as shown by the processing procedure of FIG. 7B, the program starts recording the moment the voice input button 40 is depressed (step S141). The program determines in a step S142 whether the ON state of the voice input button 40 has been released and if it decides that the voice input button 40 is ON, then it continues the recording; if it decides that the button is OFF, then it terminates the recording at that point (step S143). The program displays in a step S144 the icon 52, which indicates that voice has been captured as part of the information, on the screen of the tablet 28. The captured voice data is stored at a predetermined address of the corresponding page in the flash memory. After that, the program goes back to the step S1 of FIG. 5 to wait for a further operation.

In the processing loop R1 shown in FIG. 5, if the program decides in the step S2 that the tablet has been touched, then it determines in a step S21 whether the input pen 51 has been used for pointing at something; if the determination result is affirmative, then the program decides that the displayed icon 52 has been pointed at and it calls the function associated with the icon in a step S22. If the program decides in the step S21 that the input pen 51 has not been used to point at anything, then it decides in a step S23 that the input pen 51 has been moved, that is, the input pen 51 has been used for entering characters or line drawings and it reads a coordinate value and writes the read coordinate value at a predetermined address of the corresponding page in the flash memory 33 (steps S231 and S232) and displays the entered characters or, line drawings on the screen of the tablet 28 in a step S233 as shown by the processing procedure of FIG. 8. This processing is continued until the input pen 51 leaves the screen of the tablet; as soon as the input pen 51 leaves the screen of the tablet 28 (step S234), the program moves back to the step S1 to wait for the next operation by the user. By implementing the processing operations described above, various types of information including the image information, ink information, and voice information can be captured as desired by the user on a page basis without the need for setting the mode for each type of information to be entered. The information of each page can be read just as in the conventional pen computer; when the power switch 36 is turned ON, the information of the last page into which information has been entered is displayed. If the information of another page than the last page is required, the page feed button, namely, the next page button 37, or the previous page button 38, is depressed to change and read the displayed contents in units of pages. The information can be read in various other ways than feeding the pages until the desired page is reached; for instance, a page specifying button may be provided to specify a desired page or the desired information may be found by key words in units of pages.

The program for carrying out the processing in accordance with the present invention described above can be stored in a storing medium such as a floppy disk; the present invention includes such a storing medium.

Thus, the above embodiment has referred to a case where the pen computer, to which the present invention has been applied, is used for a business meeting or the like. The pen computer according to the present invention, however, finds a considerably wide variety of applications; for example, it may be carried for travel or the like and used to enter mountainous landscapes and add memos including such data as the name and height of a mountain with the input pen or enter voice input of comments on an ambient landscape. The pen computer in accordance with the invention is advantageous in that a plurality of types of information including image information, voice information, and pen input information can be entered as desired without the need of setting the mode, and the data can be captured as a collection of data for each page while the user is not even aware of the processing. This makes the pen computer markedly user friendly and useful in many fields.

In the embodiment above, the information that can be captured includes image information, pen input information, voice information, and additional information such as date and time; it is also possible to enter, for example, meteorological information such as temperatures and atmospheric pressure as the additional information in addition to the date and time.

Furthermore, connecting the pen computer to a personal computer or the like by using the external equipment connecting device 42 shown in FIG. 1 enables editing; for instance, the contents captured into the pen computer may be entered in the personal computer and the contents of other page maybe added, through the personal computer, to the contents captured into a certain page of the pen computer. The images displayed on the pen computer may be monochromic, however, they can be displayed in colors on the personal computer since the image data originally captured through the CCD camera may be color images.

Thus, according to the present invention, image input means and voice input means may be provided as information input means in addition to a tablet, so that image information and voice information can also be captured in addition to ink information such as characters and line drawings. Moreover, the user does not need to change the mode before capturing these different types of information, enabling the user to enter any of these types of information as desired. Further, all information including the ink information, image information, and voice information is handled as a collective information group for each page, allowing each type of information to be visualized (the voice information is displayed by an icon) and displayed on one screen.

Apparatus according to the invention can be assembled from conventional, commercially available integrated circuit components of the type generally used in data processing apparatus. The required programming can be implemented by any competent programmer on the basis of knowledge possessed by those of ordinary skill in the art, the programming flow diagrams shown in the drawing of the present application and the detailed description provided above.

Although the invention has been described in its preferred form with a certain degree of particularity, it is understood that the present disclosure of the preferred form can be changed in the details of construction and the combination and arrangement of parts may be resorted to without departing from the spirit and the scope of the invention as hereinafter claimed.

What is claimed is:

1. An information gathering and displaying apparatus comprising:
   a plurality of input devices for capturing information;
   a display device for displaying captured information;
   a data storage device having input information storage areas for storing pieces of captured information, each piece of captured information being stored at an address, a plurality of pieces of captured information defining a page of information, the data storage device further having address storage areas for storing the addresses of the pieces of captured information;
   a page changing input for inputting a page changing command; and
   a processor for controlling the input devices, the display device, the data storage device and the page changing input;
   wherein in response to a page changing command, the device accesses the address storage areas to retrieve or store the addresses of the pieces of captured information corresponding to the changed page, and accesses the input information storage areas using the addresses to retrieve or store the captured information corresponding to the page.

2. The apparatus of claim 1, wherein the address storage areas comprises a plurality of page content indicating address areas each having an address and storing the addresses of the input information storage areas corresponding to one page of information, and a page address area for storing the addresses of the page content indicating address areas.

3. The apparatus of claim 2, wherein the page change command specifies a page, and wherein the device accesses the page address area to retrieve or store the address of the page content indicating address area corresponding to the specified page, and uses the address to access the page content indicating address area corresponding to the specified page.

4. The apparatus of claim 1, wherein the address storage areas comprises a plurality of page content indicating address areas each having an address, each page content indicating address area storing the addresses of the input information storage areas corresponding to one page of information and the addresses of the page content indicating address areas corresponding to another page related to the one page.

5. The apparatus of claim 4, wherein the page changing command changes the page of information being displayed or captured from a current page to a related page, and in response to a page changing command, the device accesses the page content indicating address area corresponding to the current page to retrieve or store the address of the page content indicating address areas corresponding to the related page, and accesses the page content indicating address area corresponding to the related page to retrieve or store the addresses of the input information storage locations where captured information corresponding to the related page is stored.

6. The apparatus of claim 4, wherein the related page is the immediately preceding or following page of the one page.

7. The apparatus of claim 1, wherein the plurality of input devices comprise at least two input devices selected from an input/display tablet having a screen, an image input device for inputting image information, and a voice input device for inputting voice information.

8. The apparatus of claim 7, wherein the display device comprises a voice output device, wherein when input voice information is stored in the storage device, the screen displays a voice icon indicating the present of voice information, and wherein the voice information may be output by pointing to the voice icon using the tablet.

9. An information gathering and displaying method in an information gathering and displaying apparatus having a plurality of input devices for capturing information, a display device for displaying captured information, a data storage device for storing captured information, and a page changing command input, the method comprising:
   storing the captured pieces of information in a plurality of input information storage areas, the pieces of captured information being grouped into a plurality of pages of information;
   storing the addresses of the pieces of captured information, the addresses of each group of pieces of information corresponding to a page being stored in a page content indicating address area;
   in response to a page changing command, accessing the page content indicating address areas to retrieve or store the addresses of the pieces of captured information corresponding to the changed page; and
   accessing the input information storage areas using the addresses to retrieve or store the captured information corresponding to the changed page.

10. The method of claim 9, further comprising:
    storing the addresses of the page content indicating address areas in a page address area; and
    in response to a page changing command which specifies a page, accessing the page address area to retrieve or store the address of the page content indicating address area corresponding to the specified page; and
    using the address to access the page content indicating address area corresponding to the specified page.

11. The method of claim 9, further comprising:
    storing in each page content indicating address area the addresses of the page content indicating address areas corresponding to another page related to the one page;
    in response to a page changing command that changes the page of information being displayed or captured from a current page to the related page, accessing the page content indicating address area corresponding to the current page to retrieve or store the address of the page content indicating address areas corresponding to the related page; and accessing the page content indicating address area corresponding to the related page to retrieve or store the addresses of the input information storage locations where captured information corresponding to the related page is stored.

12. The method of claim 11, wherein the related page is the immediately preceding or following page of the one page.

13. An information gathering and displaying method in an information gathering and displaying apparatus having a plurality of input devices for capturing information, a display device for displaying captured information, a data storage device for storing captured information, and a page changing command input, the method comprising:

storing the captured pieces of information in a plurality of input information storage areas, the pieces of captured information being grouped into a plurality of pages of information;

storing the addresses of the pieces of captured information, the addresses of each group of pieces of information corresponding to a page being stored in a page content indicating address area;

in response to a page changing command, accessing the page content indicating address areas to retrieve or store the addresses of the pieces of captured information corresponding to the changed page; and accessing the input information storage areas using the addresses to retrieve or store the captured information corresponding to the changed page.

* * * * *